United States Patent
McCachren et al.

(10) Patent No.: US 11,076,727 B2
(45) Date of Patent: Aug. 3, 2021

(54) DISPENSER

(71) Applicant: Kimberly-Clark Worldwide, Inc., Neenah, WI (US)

(72) Inventors: Brian C. McCachren, Cumming, GA (US); Andrew J. Thomson, Decatur, GA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 16/651,923

(22) PCT Filed: Sep. 27, 2017

(86) PCT No.: PCT/US2017/053728
§ 371 (c)(1),
(2) Date: Mar. 27, 2020

(87) PCT Pub. No.: WO2019/066806
PCT Pub. Date: Apr. 4, 2019

(65) Prior Publication Data
US 2020/0305657 A1      Oct. 1, 2020

(51) Int. Cl.
*A47K 10/38* (2006.01)
*A47K 10/32* (2006.01)

(52) U.S. Cl.
CPC ...... *A47K 10/38* (2013.01); *A47K 2010/3233* (2013.01)

(58) Field of Classification Search
CPC ....................................................... A47K 10/38
(Continued)

(56) References Cited

U.S. PATENT DOCUMENTS 7,435,241 B1 * 10/2008 Dascanio .............. A61F 9/0008
604/294
7,833,486 B2    11/2010 Fielden et al.
(Continued)

FOREIGN PATENT DOCUMENTS

| JP | 3171288 U | 10/2011 |
| KR | 20150012002 A | 2/2015 |
| WO | 16183599 A1 | 11/2016 |

OTHER PUBLICATIONS

Byun, Hye-Ran et al., "Non-wetting superhydrophobic surface enabled by one-step spray coating using molecular self-assembled nanoparticles," Journal of Nanoscience and Nanotechnology, v 17, n 8, p. 5515-5519, 2017; ISSN: 15334880, E-ISSN: 15334899; DOI: 10.1166/jnn.2017.13805; Publisher: American Scientific Publishers, Aug. 1, 2017, http://www.ingentaconnect.com/content/asp/jnn/2017/00000017/00000008/art00051.
(Continued)

*Primary Examiner* — Gene O Crawford
*Assistant Examiner* — Ayodeji T Ojofeitimi
(74) *Attorney, Agent, or Firm* — Craig M. Bohlken

(57) ABSTRACT

A dispenser for dispensing absorbent product having an outer cover having a first cover portion, a second cover portion and an interior region configured to hold the absorbent product and at least partially defined by one or more of the first and second cover portions, wherein the first cover portion is removably engaged to at least a portion of the second cover portion along a cover joint; and wherein the outer cover includes a hydrophobic section proximate the cover joint to direct any liquid on the cover near the cover joint away from the cover joint.

11 Claims, 4 Drawing Sheets

(58) Field of Classification Search
USPC .................................................... 221/33–63
See application file for complete search history.

(56) References Cited

U.S. PATENT DOCUMENTS

| | | | |
|---|---|---|---|
| 8,318,276 | B2 | 11/2012 | Jahromi et al. |
| 9,096,786 | B2 | 8/2015 | Sikka et al. |
| 9,139,744 | B2 | 9/2015 | Sikka et al. |
| 9,382,441 | B2 | 7/2016 | Liang et al. |
| 2006/0261076 | A1* | 11/2006 | Anderson .......... A47K 10/3818 221/33 |
| 2008/0083772 | A1 | 4/2008 | Sellars et al. |
| 2011/0021098 | A1 | 1/2011 | Tabellion et al. |
| 2013/0146501 | A1 | 6/2013 | Zusmanis et al. |
| 2014/0246429 | A1* | 9/2014 | Song ...................... B65D 25/14 220/62.13 |
| 2016/0338554 | A1 | 11/2016 | Maruyama et al. |

OTHER PUBLICATIONS

Seo, Kwangseok et al., "Candle-based process for creating a stable superhydrophobic surface," Carbon, v 68, p. 583-596, Mar. 2014; ISSN: 00086223; DOI: 10.1016/j.carbon.2013.11.038; Publisher: Elsevier Ltd, Mar. 1, 2014, ittp://www.sciencedirect.com/science/article/pii/S0008622313010981.

* cited by examiner

DISPENSER

TECHNICAL FIELD

This disclosure generally relates to dispensers for dispensing absorbent products.

BACKGROUND OF THE DISCLOSURE

Systems dispensing consumable products are ubiquitous in many environments today. For example, paper hand towel dispensers are commonplace in many private, semi-private and public washrooms, work areas, food processing stations and kitchens. Given these environments, dispensers are often exposed to liquids, for example, a cleaning solution and/or water when the environment is being cleaned or through inadvertent events such as a patron splashing water from a faucet. If such a liquid enters the dispenser it can undesirably wet or moisten the paper towels, which can result in a damp or reduced strength product being dispensed to a user expecting a dry, clean towel.

SUMMARY OF THE DISCLOSURE

In general, the subject matter of this specification relates to a dispenser, e.g., a paper product dispenser. One aspect of the subject matter described in this specification can be implemented in systems that include a dispenser for dispensing absorbent product comprising: an outer cover having a first cover portion, a second cover portion and an interior region configured to hold the absorbent product and at least partially defined by one or more of the first and second cover portions, wherein the first cover portion is removably engaged to at least a portion of the second cover portion along a cover joint; and wherein the outer cover includes a hydrophobic section proximate the cover joint to direct any liquid on the cover near the cover joint away from the cover joint. Other embodiments of this aspect include corresponding methods, apparatus, and computer program products.

One aspect of the subject matter described in this specification can be implemented in a method that includes applying a hydrophobic material to a dispenser for dispensing absorbent product, wherein the dispenser has an outer cover having a first cover portion, a second cover portion and an interior region configured to hold the absorbent product and at least partially defined by one or more of the first and second cover portions, the first cover portion is removably engaged to at least a portion of the second cover portion along a cover joint; and the hydrophobic material is applied proximate the cover joint to direct any liquid on the cover near the cover joint away from the cover joint. Other embodiments of this aspect include corresponding systems, apparatus, and computer program products.

Particular embodiments of the subject matter described in this specification can be implemented so as to realize one or more of the following advantages. Many product dispensers use a clam-shell type design to allow attendants to "open" the dispenser and access the interior of the dispenser, where the product is stored, for example, to refill the product, perform maintenance or the like. For those dispensers that don't employ such a clam-shell design there is almost universally a door or other access point to the interior of the dispenser.

In either case, the dispenser has a joint or seem that separates the two halves or portions of the dispenser that allow interior access. Such a joint is a natural junction through which water or other liquids (or other debris) can enter the dispenser. Such an infiltration event is generally undesirably. For example, the interior of the dispenser may include dry, absorbent product such as paper towels, or electrical or mechanical components that are liquid sensitive. As such, if, for example, water seeped through the joint and moistened the paper towels and then these wet paper towels are dispensed to a user expecting dry paper towels to dry their hands, the user has an unsatisfactory experience. Further, water in the interior of a dispenser may promote bacterial growth and otherwise culture unwanted substances or cause electrical or mechanical devices in the dispenser to malfunction.

To avoid this, the dispenser described herein has a hydrophobic (or other liquid phobic or repelling material) section proximate, e.g., abutting, the joint on one or both sides. As such when water is introduced to an area near the joint the hydrophobic section discourages (e.g., repels) the water from approaching and penetrating the joint. In this way, the dispenser reduces the likelihood that water with enter the interior of the dispenser through the joint, which reduces damage to the interior of the dispenser (e.g., to sensitive electrical or mechanical components) and/or prevents the water from compromising the consumable product in the dispenser (e.g., by weakening the product due to moisture on the product or reducing the potential for unwanted bacterial or substance growth on the product) and/or prevents waste and avoids cost from having to discard compromised products and replacement with new products.

The details of one or more implementations of the subject matter described in this specification are set forth in the accompanying drawings and the description below. Other features, aspects, and advantages of the subject matter will become apparent from the description, the drawings, and the claims.

Figure 1A:
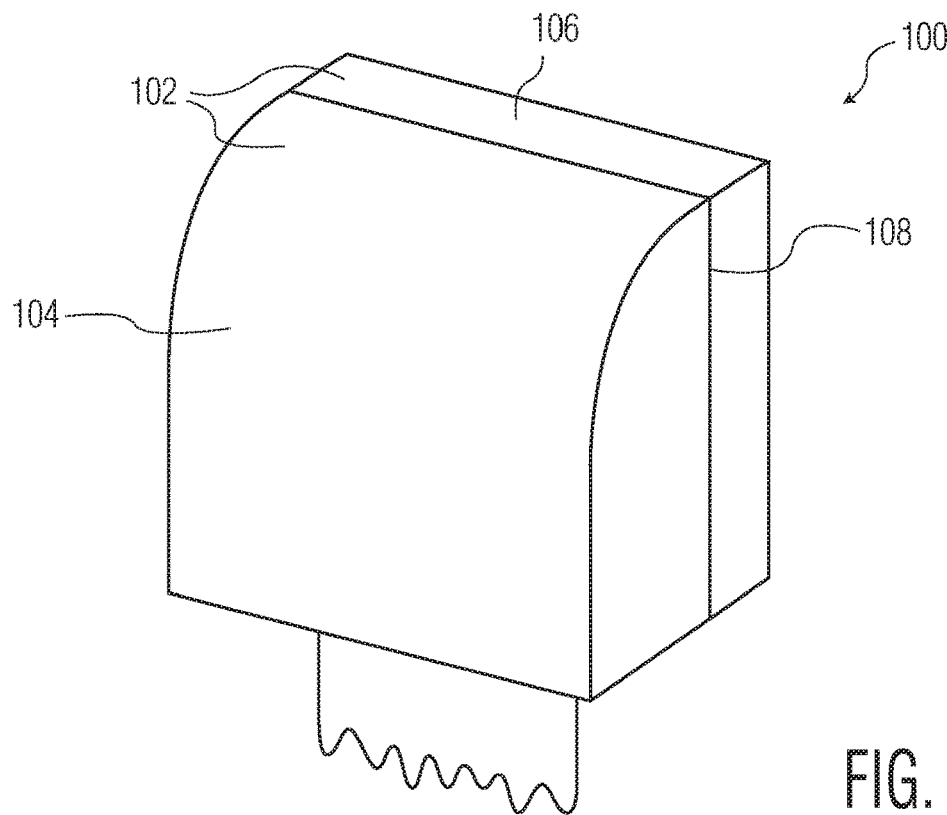
FIG. 1A is a representation of an example product dispenser.

Repeat use of reference characters in the present specification and drawings is intended to represent the same or analogous features or elements of the disclosure.

DETAILED DESCRIPTION OF THE DISCLOSURE

Liquids entering into dispensers can be quite problematic, for example, for the reasons described above. The present dispenser reduces the likelihood of liquid, e.g., water, unintentionally entering the dispenser by providing a hydrophobic surface (and/or other liquid repellents) around any joints or seems in the dispenser's outer cover (or any other potential entry points into the interior of the dispenser). In this way the hydrophobic surface will direct any water (or other liquid depending on the type of repellant) away from it and also away from the joint, as the hydrophobic surface is proximate and in some cases abuts the joint on both sides, which reduces the likelihood that the water will approach and penetrate the joint.

FIG. 1A is a representation of an example dispenser 100. The dispenser 100 can be, for example, a dispenser that dispenses an (absorbent) consumable product such as a bath tissue dispenser 100, a hand towel dispenser 100, a wiper or wiper dispenser 100, or the like for rolled or stacked paper products. More generally, a dispenser is any container that encloses material or components that are water or liquid sensitive and dispenses a consumable product. Paper products describes sheet materials made from cellulose fibers (e.g., wood pulp), synthetic fibers (e.g., polypropylene) or some combination thereof, and include, for example, bath tissue, paper towels and wipers.

Figure 1B:
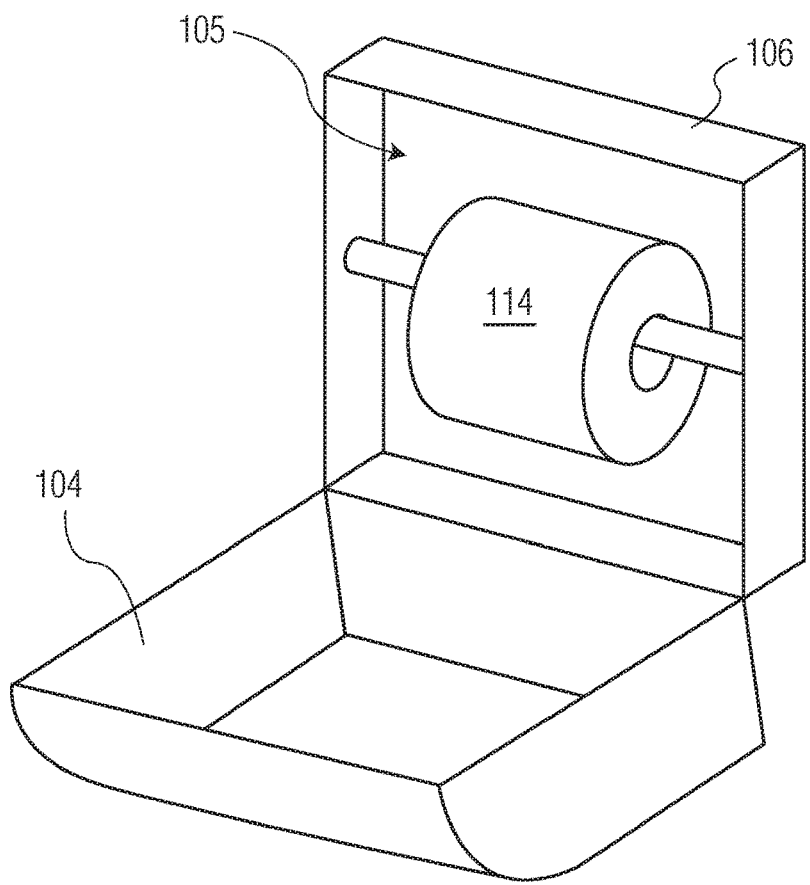
FIG. 1B is a representation of the example product dispenser with its outer cover in the open position.

The dispenser 100 includes a body 102 or outer cover 102, e.g., a composite or metal housing. FIG. 1B is a representation of the example dispenser 100 with its outer cover 102 in an open position; the outer cover 102 is closed in FIG. 1A. The outer cover 102 encloses, fully or partially, a product holding area 105 or interior 105 of the dispenser. The product holding area 105 holds, for example, the product-to-be-dispensed 114 by the dispenser 102 and, in some implementations, one or more electrical or mechanical components used to enable the dispense process such as a motor, batteries, rollers, sensors to determine when a user requests a dispense, etc.

In some implementations, the product holding area 105 is a space or cavity within the dispenser 100 in which the product 114 can be positioned for dispensing, and can be accessed by rotating or pivoting the first cover portion 104 (e.g., the front cover), from a closed position, away from the second cover portion 106 (e.g., the back cover) by a hinge or the like to an open position. More generally, the first cover portion 104 is movably engaged to at least a portion of the second cover portion 106 along a cover joint 108, which delineates, at least in part, the first and second cover portions 104, 106. The first cover portion 104, when in the closed position, and the second cover portion 106 define the product holding area/interior 105. In some implementations, the joint 108 is a butt joint or an overlap joint, e.g., the first and second cover portions 104, 106 overlap each other when in a closed position.

Figure 2:
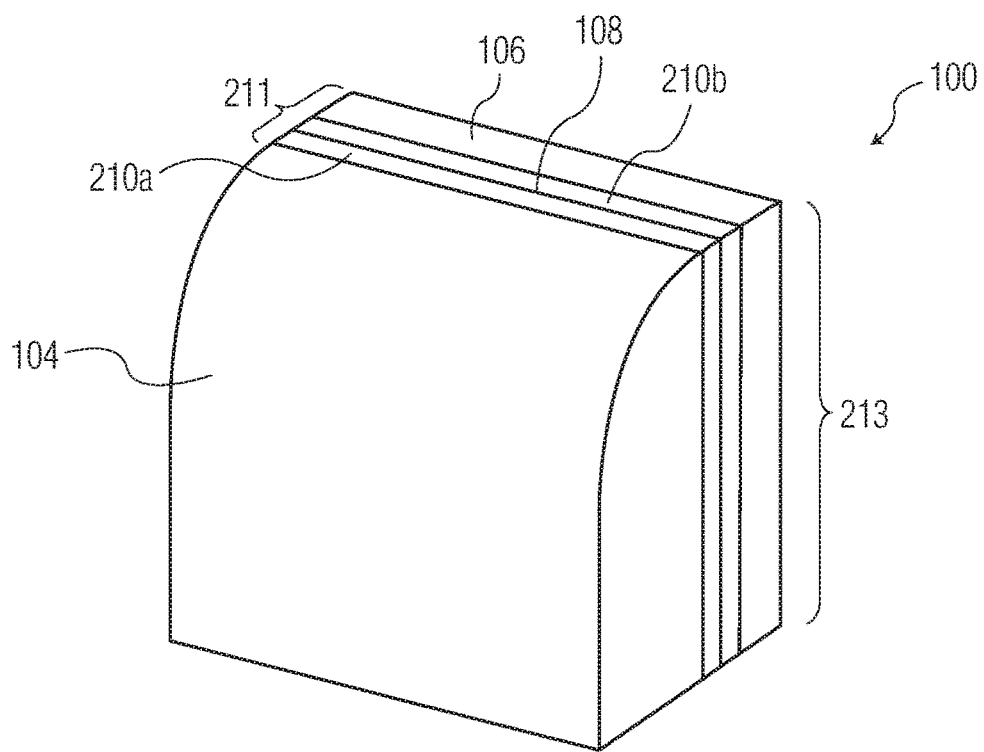
FIG. 2 is representation of an example product dispenser with a hydrophobic section.
Figure 3:
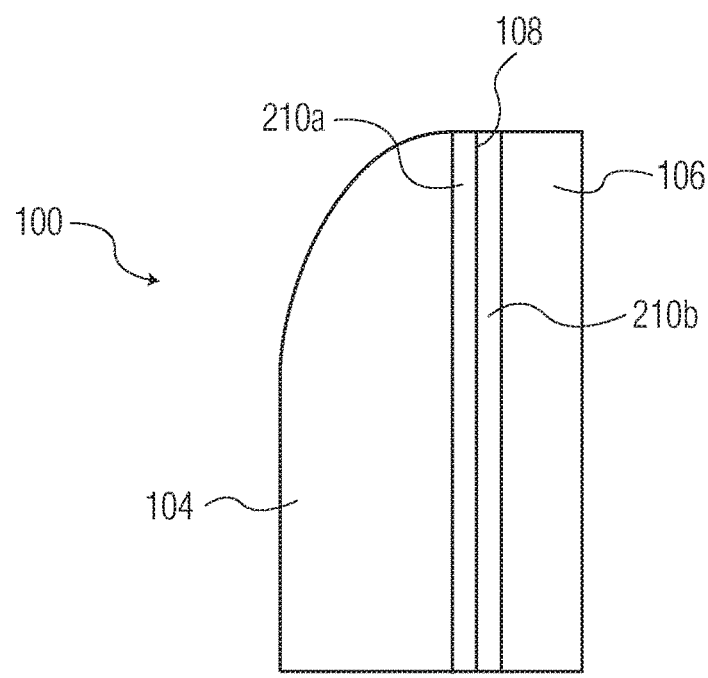
FIG. 3 is a side view of the dispenser of FIG. 2.
Figure 4:
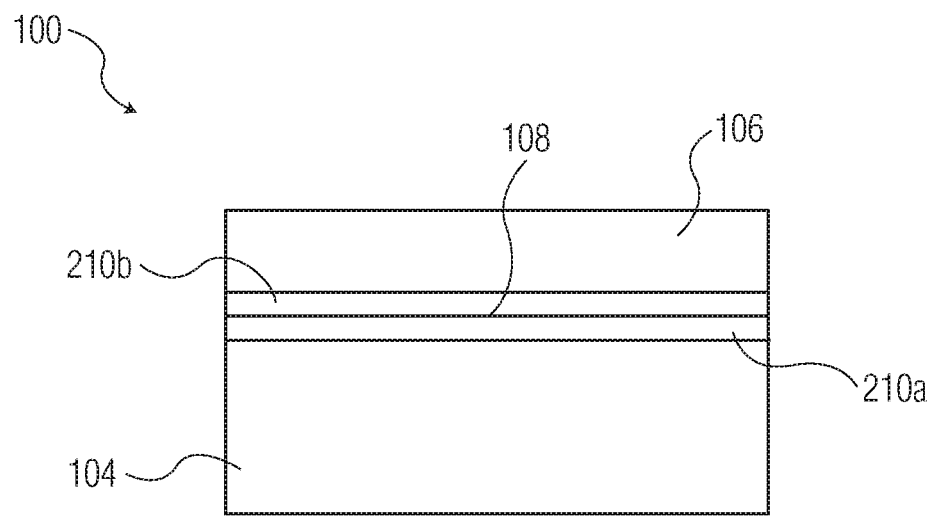
FIG. 4 is a top view of the dispenser of FIG. 2.

Given that the dispenser 100 may be susceptible to liquid penetration (e.g., entering into the interior 105 of the dispenser 100) at the joint 108 (or any other discontinuity or seem on the outer cover 102), the outer cover 102 includes a hydrophobic section 210 proximate the cover joint 108 to direct any water on the cover 102 near the cover joint 108 away from the cover joint 108. The hydrophobic section 210 is shown in FIG. 2, which is representation of an example product dispenser 100 with a hydrophobic section 210, FIG. 3 is a side view of the dispenser 100 of FIG. 2, and FIG. 4, which is a top view of the dispenser 100 of FIG. 2.

In some implementations, the hydrophobic section 210 abuts the joint 108 on both sides of the joint 108 for the entirety of the joint 108 or, in others, for only a portion of the joint 108. For example, the hydrophobic section 210 may abut the joint 108 only on the top side 211 of the dispenser 100, only along one or both sides 213 of the dispenser 100 or some combination thereof. Thus when water is directed at the dispenser 100 (e.g., as when cleaning an area in which the dispenser 100 is located), the water droplets land on or near the hydrophobic section 210 and are directed to an area on the dispenser 100 that does not have the repelling properties of the hydrophobic section 210. Given that the hydrophobic section 210 is proximate the joint 108, water introduced on the dispensers 100 is directed away from the joint 108, thereby reducing the likelihood that water enters the interior 105.

In some implementations the hydrophobic section 210 is created by applying a hydrophobic coating (e.g., a paste or spray) on the outer cover 102 in the area of the joint 108. In some implementations, the outer cover 102 is made of a thermoplastic material (e.g., polypropylene, polyvinyl chloride, polystyrene, etc.) and the hydrophobic section 210 is made from a hydrophobic material being added to the thermoplastic material in the area of the joint 108 (e.g., during the thermo molding or extrusion process).

In some implementations, the hydrophobic section 210 is only proximate the joint 108. For example, the hydrophobic section 210 only extends out 0.25 to 3 inches (and more preferably from about 0.5 to 1.5 inches) from the joint 108 (e.g., the hydrophobic section 210 has a width of about 0.5 to 2 inches). Given that there likely will be an added expense associated with the hydrophobic section 210, as opposed to non-treated sections, it may not be desirable or necessary to have the entire or a majority of the out cover 102 be hydrophobic; although such an implementation is within the scope described herein.

As described above, the hydrophobic section 210 can be on one or both sides of the joint 108. More generally, the first cover portion 104 has a first joint portion 210a proximate the joint 108 and the second cover portion 106 has a second joint portion 210b proximate the joint 108. As such, the hydrophobic section 210 can include only one or both of the first and second joint portions 210a and 210b. For example, in the case of the hydrophobic section 210 including only one of the first and second joint portions 210a, 210b, in some implementations, the hydrophobic section 210 includes only the section 210b as any water on the top of the dispenser 100 will be pulled down by gravity towards the joint 108 and, thus, needs to be directed away from the joint, e.g., down the sides of the dispenser 100. And any water on the outer cover 102 below the joint 108 will be pulled away from the joint 108 by gravity. However, in some cases, high pressure water may be directed at the dispenser 100 (e.g., in a food preparation room cleaning scenario) and thus water could be directed up from below the joint 108 into the joint 108. In these cases it may be desirable to also have the hydrophobic section 210 include section 210a to discourage water from being pushed up into the joint 108.

The width(s) of the various hydrophobic sections 210 (e.g., 210a, 210b) does not have to be constant. Rather, in some implementations, the hydrophobic section 210 has varying widths (in addition or alternative to varying lengths). For example, on one side of the joint 108, the hydrophobic section 210 may start out as a wide line at a top 211 of the dispenser 100 proximate the joint 108 and narrow as it extends towards and/or down the sides 213 of the dispenser 100. As the top 211 of the dispenser 100 is often flatter than the front, back or sides 213, water may have a greater chance to penetrate the joint 108 at the top 211 because gravity does not have as great an effect on this flatter surface. As such, the water may have more dwell time on the top 211 and thus more of an opportunity to enter the interior 105. To this end, it may be advantageous to have a wider line or section of hydrophobic material at the top 211 (e.g., as compared to the sides 213) to provide a greater barrier to water penetrating the joint 108 at the top 211 in light of the longer dwell time.

Figure 5:
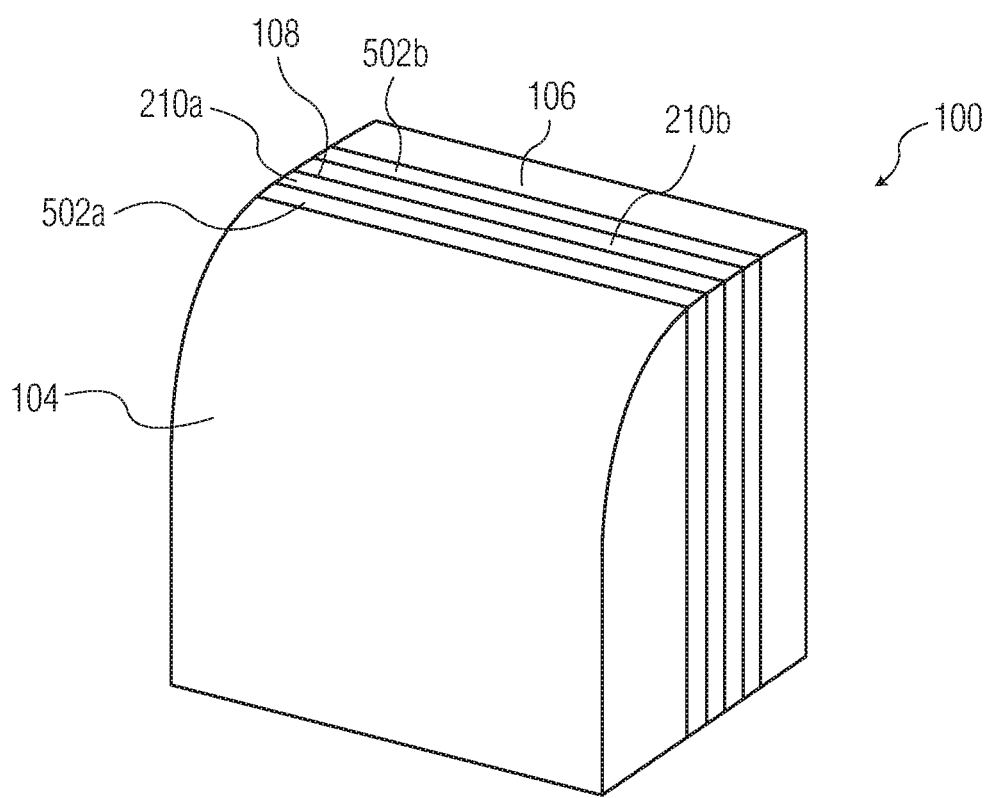
FIG. 5 is representation of an example product dispenser with hydrophobic and hydrophilic sections.

In some implementations, the outer cover 102 includes a hydrophilic section 502 adjacent to the hydrophobic section 210 as shown in FIG. 5. For example, the hydrophobic section 210, e.g., 210a and 210b, abut the joint 108 and the hydrophilic section 502, e.g., 502a and 502b, abut the hydrophobic section 210 such that the hydrophilic section 502 is further from the joint 108 than the hydrophobic section 210. In this way, water is both repelled away from the joint 108 by the hydrophobic section 210 and pulled away from the joint 108 and hydrophobic section 210 by the hydrophilic section 502. In some implementations, the hydrophilic section 502 extends along the joint 108 coextensive with the hydrophobic section 210 while in others the hydrophilic section 502 only extends along a partial length of the hydrophobic section 210, e.g., only on the top 211 of the dispenser 100.

Figure 6:
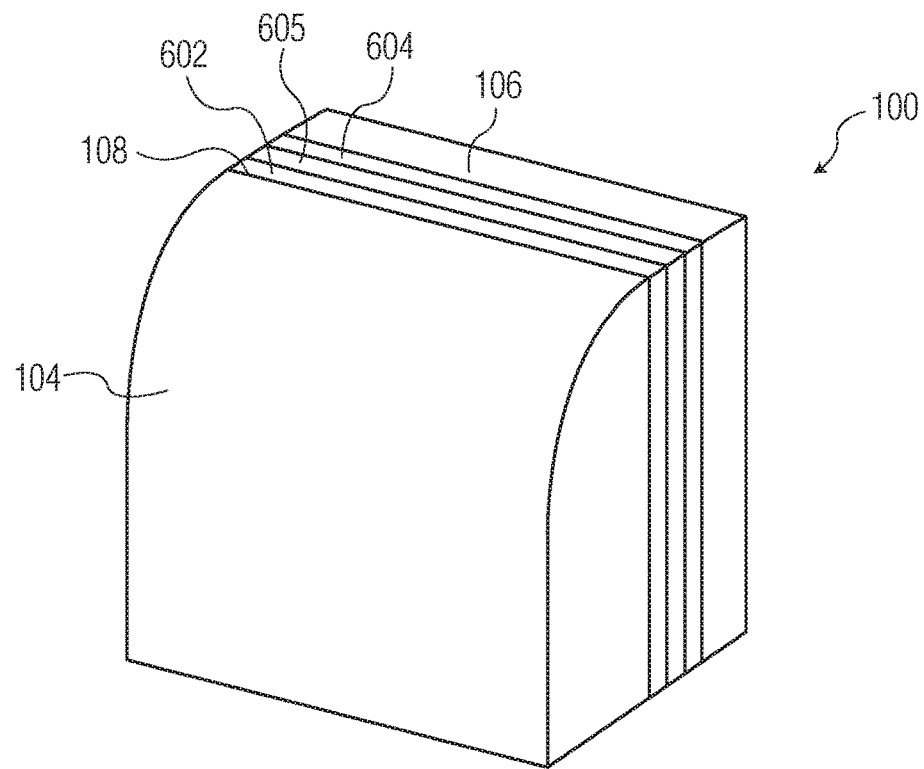
FIG. 6 is representation of an example product dispenser with hydrophobic channel.

In some implementations, the hydrophobic section 210 (on one side of the joint 108) includes two lines of hydrophobic material separated by a first distance to create a channel for the water directing any water in that area away from the joint 108, as shown in FIG. 6, which is representation of an example product dispenser 100 with hydrophobic channel 605. For example, the hydrophobic section 210 includes the hydrophobic channel 605. In some implementations, the hydrophobic channel is formed by a hydrophobic line 602, e.g., a 0.25 to 2 inch wide line, abutting (e.g., adjacent) to the joint 108 on one side and a neutral (e.g., neither hydrophobic nor hydrophilic) or hydrophilic channel 605 on the other side. On the far side of the channel 605, furthest from the joint 108, the channel 605 is bounded by another hydrophobic line 604, similar to line 602. Thus as water is directed towards the joint the two hydrophobic lines 602 and 604 encourage the water into the channel 605, which may direct the water down the side 213 of the dispenser while keeping it away from the joint 108. In some implementations, the channel 605 is 0.25 to 2 inches wide.

Figure 7:
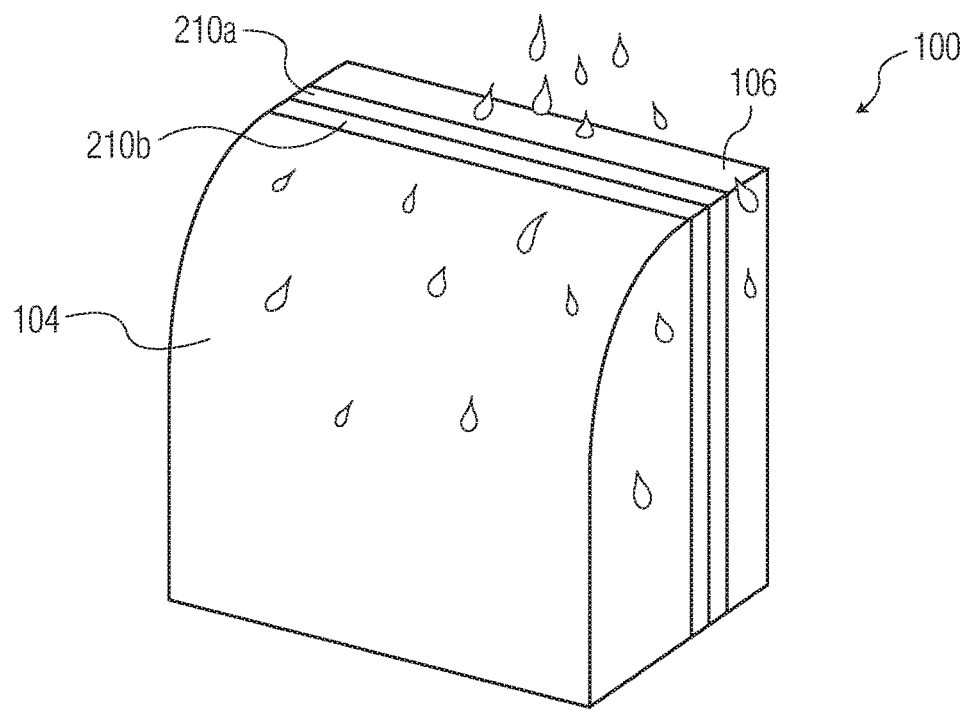
FIG. 7 is a perspective view of the dispenser of FIG. 2 with water being repelled away from the joint.

In some implementations, in addition or alternative to a hydrophobic section 210, the dispenser 100 includes other types of liquid-phobic materials such as, for example, oleophobic or, more generally, omniphobic materials—materials that have a generally propensity to repel liquids. Further, the area proximate the joint 108 can have a surface pattern, e.g., a printed or etched pattern, as opposed to a chemical coating, that functions to repel one or more types of liquid. For example, the hydrophobic section 210 (or other liquid repellant section 210) includes such a surface pattern to repel water (and/or other liquids depending on the particular pattern) (see, e.g., "Multifunctional surfaces produced by femtosecond laser pulses," Journal of Applied Physics 117, 033103 (2015), hereby incorporated by reference). FIG. 7 is a perspective view of the dispenser 100 of FIG. 2 with water (or another liquid) being repelled away from the joint 108.

Although the above description has focused on repelling liquids away from the joint 108, the same approach could be used for any other liquid-sensitive areas of the dispenser 100. For example, in the case of a motorized dispenser 100, if the dispenser 100 has a separate door to access batteries to use to power the motor, a hydrophobic section could be placed around that door. By way of another example, a hydrophobic (or other liquid-repelling material) section could be placed around the mouth of the dispenser 100, i.e., the area where paper towels are dispensed, to keep liquid from dripping on towels as they are dispensed or are waiting to be dispensed.

Embodiments

Embodiment 1. A dispenser for dispensing absorbent product comprising:

an outer cover having a first cover portion, a second cover portion and an interior region configured to hold the absorbent product and at least partially defined by one or more of the first and second cover portions, wherein the first cover portion is movably engaged to at least a portion of the second cover portion along a cover joint; and wherein the outer cover includes a hydrophobic section proximate the cover joint to direct any liquid on the cover near the cover joint away from the cover joint.

Embodiment 2. The dispenser of embodiment 1, wherein the hydrophobic section comprises a hydrophobic coating applied on the outer cover.

Embodiment 3. The dispenser of embodiment 1, wherein the outer cover comprises a thermoplastic material and the hydrophobic section comprises a hydrophobic additive to the thermoplastic material.

Embodiment 4. The dispenser of any preceding embodiment, wherein the hydrophobic section is only proximate the cover joint.

Embodiment 5. The dispenser of any preceding embodiment, wherein the first cover portion has a first joint portion proximate the cover joint and the second cover portion has a second joint portion proximate the cover joint, and the hydrophobic section comprises the first and second joint portions.

Embodiment 6. The dispenser of any preceding embodiment, wherein the first cover portion has a first joint portion proximate the cover joint and the second cover portion has a second joint portion proximate the cover joint, and the hydrophobic section comprises only one of the first and second joint portions.

Embodiment 7. The dispenser of any preceding embodiment, wherein the outer cover has a top portion and a bottom portion opposite the top portion, and the top portion comprises the hydrophobic section.

Embodiment 8. The dispenser of any preceding embodiment, wherein the outer cover comprises a hydrophilic section adjacent to the hydrophobic section.

Embodiment 9. A method comprising: applying a hydrophobic material to a dispenser for dispensing absorbent product, wherein the dispenser has an outer cover having a first cover portion, a second cover portion and an interior region configured to hold the absorbent product and at least partially defined by one or more of the first and second cover portions, the first cover portion is removably engaged to at least a portion of the second cover portion along a cover joint; and the hydrophobic material is applied proximate the cover joint to direct any liquid on the cover near the cover joint away from the cover joint.

Embodiment 10. The method of embodiment 9, wherein applying the hydrophobic material comprises applying a coating of the hydrophobic material proximate the cover joint.

Embodiment 11. The method of embodiment 9, wherein the outer cover comprises a thermoplastic material and applying the hydrophobic material comprises adding a hydrophobic additive to the thermoplastic material during a molding process forming the outer cover.

Embodiment 12. The method of any of embodiments 9-11, wherein the dispenser is a paper hand towel dispenser.

Embodiment 13. The method of any of embodiments 9-12, wherein applying the hydrophobic material comprises applying the hydrophobic material to a previously installed dispenser.

Embodiment 14. The method of any of embodiments 9-13, wherein applying the hydrophobic material comprises providing the hydrophobic material as a thin line at a top of the dispenser proximate the cover joint and providing a wider line of the hydrophobic material at a portion of the dispenser below the top.

Embodiment 15. The method of any of embodiments 9-14, wherein applying the hydrophobic material comprises providing two lines of hydrophobic material separated by a first distance to create a channel for the liquid directing the liquid away from the cover joint.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method comprising:
applying a hydrophobic material to a dispenser for dispensing absorbent product, wherein the dispenser has an outer cover having a first cover portion, a second cover portion and an interior region configured to hold the absorbent product and at least partially defined by one or more of the first and second cover portions, the first cover portion is removably engaged to at least a portion of the second cover portion along a cover joint; and the hydrophobic material is applied proximate the cover joint to direct any liquid on the cover near the cover joint away from the cover joint, wherein
applying the hydrophobic material comprises applying a coating of the hydrophobic material proximate the cover joint which comprises applying the hydrophobic material as a wide line at a top of the dispenser proximate the cover joint and providing a narrower line of the hydrophobic material at a portion of the dispenser below the top.

2. A dispenser for dispensing absorbent product comprising:
an outer cover having a first cover portion, a second cover portion and an interior region configured to hold the absorbent product and at least partially defined by one or more of the first and second cover portions, wherein the first cover portion is movably engaged to at least a portion of the second cover portion along a cover joint; and
wherein the outer cover includes a hydrophobic section proximate the cover joint to direct any water on the cover near the cover joint away from the cover joint, wherein the hydrophobic section comprises two lines of hydrophobic material separated by a first distance to create a channel for the liquid directing the liquid away from the cover joint.

3. The dispenser of claim 2, wherein the hydrophobic section comprises a hydrophobic coating applied on the outer cover.

4. The dispenser of claim 2, wherein the outer cover comprises a thermoplastic material and the hydrophobic section comprises a hydrophobic additive to the thermoplastic material.

5. The dispenser of claim 2, wherein the hydrophobic section is only proximate the cover joint.

6. The dispenser of claim 2, wherein the outer cover has a top portion and a bottom portion opposite the top portion, and the top portion comprises the hydrophobic section.

7. The dispenser of claim 2, wherein the outer cover comprises a hydrophilic section adjacent to the hydrophobic section.

8. A method comprising:
applying a hydrophobic material to a dispenser for dispensing absorbent product, wherein the dispenser has an outer cover having a first cover portion, a second cover portion and an interior region configured to hold the absorbent product and at least partially defined by one or more of the first and second cover portions, the first cover portion is removably engaged to at least a portion of the second cover portion along a cover joint; and the hydrophobic material is applied proximate the cover joint to direct any liquid on the cover near the cover joint away from the cover joint, wherein
applying the hydrophobic material comprises applying a coating of the hydrophobic material proximate the cover joint which comprises providing two lines of hydrophobic material separated by a first distance to create a channel for the liquid directing the liquid away from the cover joint.

9. The method of claim 8, wherein the outer cover comprises a thermoplastic material and applying the hydrophobic material comprises adding a hydrophobic additive to the thermoplastic material during a molding process forming the outer cover.

10. The method of claim 8, wherein the dispenser is a paper hand towel dispenser.

11. The method of claim 8, wherein applying the hydrophobic material comprises applying the hydrophobic material to a previously installed dispenser.

* * * * *